United States Patent Office 3,387,046
Patented June 4, 1968

3,387,046
PRODUCTION OF SOLUBLE POLYCYCLO-
PENTADIENES
James W. Cleary, Bartlesville, Okla., assignor to Phillips
Petroleum Company, a corporation of Delaware
No Drawing. Filed Nov. 5, 1965, Ser. No. 506,594
7 Claims. (Cl. 260—666)

ABSTRACT OF THE DISCLOSURE

A soluble polycyclopentadiene is produced by the polymerization of a cyclopentadiene in the presence of an alkylbenzene, a solvent for said cyclopentadiene and an aluminum halide or organo aluminum halide catalyst; the cyclopentadiene, solvent and alkylbenzene having been scavenged prior to contact with the catalyst by the use of a compound represented by the formula $M(R)_y$ wherein M is a Group I-A, II-A, II-B or III-A metal, R is alkyl, cycloalkyl, aryl or combinations thereof having from 1 to 16 carbon atoms.

This invention relates to a new and improved process for the production of soluble polymers of cyclopentadienes.

Processes for the production of polycyclopentadienes with aluminum halide or alkylaluminum catalysts are known. However, it has been difficult to use such prior art processes to make a polymer that is soluble in the polymerization medium or in conventional solvents. The production of soluble polycyclopentadienes is highly desirable so that it can be further treated or reacted in solution form, or so that it can utilized, for example, in coating operations. Accordingly, it is an object of the invention to provide an improved process for the production of soluble polymers of cyclopentadienes. Other objects, aspects and advantages of the invention will be apparent from a study of the disclosure and the appended claims.

In accordance with the invention, I have discovered that soluble polymers of cyclopentadienes can be produced with aluminum halide catalysts or alkylaluminum halide catalysts if the polymerization medium contains at least five volume percent of one or more alkylbenzenes and the polymerization system is scavenged prior to the addition of the catalyst.

Cyclopentadienes which can be polymerized to produce soluble polymers in accordance with the invention can be represented by the formula:

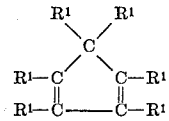

wherein each $R^1$ is selected from the group consisting of alkyl, cycloalkyl, aryl, and combinations thereof, containing from 1 to 16 carbon atoms, and hydrogen. The $R^1$'s can be the same or different. Representative examples of such cyclopentadienes include:

cyclopentadiene
5-methylcyclopentadiene
5-hexadecylcyclopentadiene
5-phenylcyclopentadiene
5-cyclopentylcyclopentadiene
5-benzylcyclopentadiene
5-(4-cyclohexylphenyl)cyclopentadiene
5-(3-phenylcyclopentyl)cyclopentadiene
5,5-dioctylcyclopentadiene
5-(9-anthryl)cyclopentadiene
5-(4-cyclohexyl-2-naphthyl)cyclopentadiene
5,5-dimethylcyclopentadiene
1-ethylcyclopentadiene
2-(2-toyl)cyclopentadiene
2-(3,5-diisopentylphenyl)cyclopentadiene
1,2,3,4-tetrabutylcyclopentadiene
1-isopropylcyclopentadiene
1,3-dimethyl-5-decylcyclopentadiene
5-ethylcylopentadiene
1,2,3,4,5,5-hexamethylcylopentadiene and the like, as well as mixtures thereof.

Catalysts which can be utilized in the process of the invention can be represented by the formula $Al(R^2)_n X_{3-n}$ wherein each $R^2$ is selected from the group consisting of alkyl, cycloalkyl, aryl, and combinations thereof, containing from 1 to 16 carbon atoms, the $R^2$'s being the same or different; X is a halogen selected from the group consisting of fluorine, chlorine, bromine and iodine; and $n$ is selected from the group consisting of 0, 1 and 2. Representative examples of such suitable catalysts include:

aluminum chloride
aluminum bromide
ethylaluminum dichloride
diethylaluminum chloride
hexadecylaluminum dibromide
phenylaluminum diiodide
cyclohexylaluminum difluoride
benzylaluminum dichloride
di-2-tolylaluminum bromide
di-3-cyclohexyl-1-naphthylaluminum chloride
di-5-phenyldecylaluminum bromide
1-anthrylaluminum diiodide
3-cyclohexylphenylaluminum dichloride
3-benzylphenylaluminum dibromide
3-(3-tolylcyclopentyl)aluminum difluoride
3-octylcyclohexyaluminum diiodide
di-3-phenylcyclopentylaluminum chloride
di-6-cyclohexyldecylaluminum bromide
isobutylaluminum dichloride
diisobutylaluminum bromide and the like, as well as mixtures thereof. A presently preferred catalyst is the equimolar mixture of ethylaluminum dichloride and diethylaluminum chloride, sometimes referred to as ethylaluminum sesquichloride. The catalyst is generally used in a concentration of 1 to 25, and preferably 3 to 15, millimols per 100 grams of monomer.

The polymerization is conducted in the presence of a material which is a solvent for the monomer. In general, benzene, cycloaliphatics and alkylcycloaliphatics wherein the alkyl groups contain from 1 to 3 carbon atoms, are satisfactory solvents for this purpose. Specific examples of suitable solvents include:

benzene
cyclopentane
methylcyclopentane
cyclohexane
methylcyclohexane cycloheptane
ethylcyclopentane
1,3,5-trimethylcyclohexane
isopropylcyclopentane
1,3-diethylcyclopentane
propylcyclohexane
1,2,3,4,5,6-hexamethylcyclohexane
1,1-dipropylcyclopentane
1,1,3,3-tetraethylcyclohexane and the like, as well as mixtures thereof.

The amount of solvent in the monomer-solvent-alkylbenzene reaction mixture is generally in the range of 100 to 2500 preferably in the range of 500 to 1500, milliliters of solvent per 100 grams of monomer.

In accordance with the invention, the reaction mixture comprising the monomer, solvent and alkylbenzene is scavenged before the polymerization catalyst is added thereto. The term scavenger designates a material which will react catalyst poisons, such as water, carbon dioxide, oxygen and active hydrogen compounds, such as acids and the like, but which not significantly catalyze the polymerization reaction. The monomer, solvent and alkylbenzene can be scavenged separately or in admixture with each other. The scavenger of the invention can be represented by the formula $M(R^3)_y$, wherein M is a metal selected from the group consisting of the metals of Groups I-A, II-A, II-B and III-A of the Periodic Table shown on page B-2 of the "Handbook of Chemistry and Physics," 45th ed., published by the Chemical Rubber Company in 1964; each $R^3$ is selected from the group consisting of alkyl, cycloalkyl, aryl, and combinations thereof containing from 1 to 16 carbon atoms; the $R^3$'s being the same or different; and $y$ is the valence of the metal M. Representative examples of suitable scavengers include:

butyllithium
diisopropylmagnesium
didecylcalcium
hexadecylsodium
diethylzinc
triethylaluminum
phenylpotassium
dibenzylberyllium
tri-9-anthrylaluminum
2-tolylrubidium
dioctylstrontium
di(3-cyclohexylphenyl)cadmium
tri(2-cyclopentylphenyl)gallium
tri(3-cyclopentylcyclohexyl)indium
tri(3-decylcyclohexyl)thallium
5-cyclohexyldecylcesium
triisobutylaluminum
di(3-benzylphenyl)barium
di-3-hexylphenylmercury
trimethylaluminum and the like, and combinations thereof. The presently preferred scavenger is trialkylaluminum, and more specifically triethylaluminum.

The amount of scavenger added to the monomer-solvent-alkylbenzene reaction mixture or separate elements or subcombinations thereof is generally in the range of 0.1 to 10, and preferably in the range of 2 to 8, millimols of scavenger per 100 grams of material to be scavenged. The scavenger is added to the monomer-solvent-alkylbenzene reaction mixture or components thereof at a suitable time prior to the introduction of the polymerization catalyst, generally in the range of 1 to 60, and preferably in the range of 5 to 40, minutes prior to the addition of the polymerization catalyst. The scavenging operation is conducted at a suitable reaction temperature, generally in the range of 32° F. to 150° F., and preferably in the range of 50° F. to 100° F., and at a suitable pressure, generally in the range of about atmospheric to 100 p.s.i.a. or higher, preferably at atmospheric pressure.

The alkylbenzene of the invention can be represented by the formula:

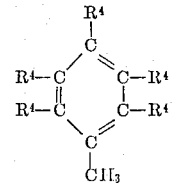

wherein $R^4$ is selected from the group consisting of hydrogen and methyl. Examples of suitable alkylbenzenes include:

toluene
o-xylene
m-xylene
p-xylene
1,2,3-trimethylbenzene
1,2,4-trimethylbenzene (pseudocumene)
1,3,5-trimethylbenzene
1,2,3,5-tetramethylbenzene
1,2,3,4-tetramethylbenzene
1,2,3,4,5-pentamethylbenzene, and
hexamethylbenzene and mixtures thereof. In a presently preferred embodiment of the invention at least two of the $R^4$'s are methyl. The amount of alkylbenzene added to the monomer-solvent reaction mixture is at least 5 volume percent, based on the solvent, and preferably in the range of 5 to 50 volume percent, based on the solvent contained in the monomer-solvent reaction mixture. When utilizing an alkylbenzene having at least three methyl groups the amount of alkylbenzene added generally will be in the range of 5 to 50 volume percent, based on the solvent, whereas the amount of a dimethylbenzene utilized will generally be in the range of 10 to 50 volume percent, based on the solvent, and the amount of toluene utilized will generally be in the range of 25 to 50 volume percent, based on the solvent.

The polymerization reaction is carried out at a suitable temperature generally in the range of 32° F. to 150° F., and preferably in the range of 50° F. to 100° F., for a sufficient time, generally in the range of 1 minute to 24 hours, preferably in the range of 10 minutes to 10 hours, under a suitable pressure, generally in the range of about atmospheric to 100 p.s.i.a. or higher, preferably at atmospheric pressure. The polymerization reaction can be conducted in batch fashion or in a continuous process.

The polymer produced in accordance with the invention is readily soluble in the reaction mixture. The polymer can be utilized in the solution form of the reaction effluent, or the polymer can be recovered therefrom by conventional methods, including, among others, fractionation, steam stripping, and the like. Optionally, the catalyst can be deactivated, such as by treatment with an alcohol, prior to use of the polymer solution or to recovery of the polymer.

The following examples are presented in further illustration of the invention and should not be construed to unduly limit the invention.

Example I

In all the polymerization runs tabulated below (with the indicated exceptions), 10 grams of cyclopentadiene in 100 ml. of the indicated solvent was mixed with 0.33 millimol of triethylaluminum and allowed to stand 30 minutes, 0.5 millimol of ethylaluminum sesquichloride was then added, and polymerization was allowed to proceed for 4 hours at 73° F. and atmospheric pressure in the presence of the indicated amount of pseudocumene.

The conversion obtained and appearance of the polymer is indicated:

| Run No. | Solvent | Pseudo-cumene, ml. | Conversion, wt. percent | Appearance of Polymer Solution |
|---|---|---|---|---|
| 1 [1] | Benzene (Bz) | 0.0 | 100 | Set-up gel. |
| 2 | do | 0.0 | 100 | Do. |
| 3 | do | 0.1 | 100 | Gel. |
| 4 | do | 1.0 | 100 | Semi-fluid gel. |
| 5 | do | 5.0 | 100 | Fluid solution. |
| 6 | do | 10.0 | 100 | Do. |
| 7 [2] | Cyclohexane (CH) | 0.0 | 100 | Set-up gel. |
| 8 | do | 0.0 | 67 | Do. |
| 9 | do | 2.0 | 86 | Gel. |
| 10 | do | 3.0 | 92 | Do. |
| 11 | do | 4.0 | 82 | Do. |
| 12 | do | 5.0 | 81 | Viscous solution. |
| 13 | 80 Bz/20 CH | 5.0 | 100 | Fluid solution. |
| 14 | 60 Bz/40 CH | 5.0 | 94 | Do. |
| 15 | 50 Bz/50 CH | 2.0 | 98 | Gel. |
| 16 | 50 Bz/50 CH | 3.0 | 96 | Do. |
| 17 | 50 Bz/50 CH | 4.0 | 97 | Viscous solution. |
| 18 | 40 Bz/60 CH | 5.0 | 97 | Fluid solution. |
| 19 | 20 Bz/80 CH | 5.0 | 94 | Viscous solution. |

[1] No scavenger used, run length was 1 hour.
[2] No scavenger used; 50 ml. of cyclohexane used.

These data show that without scavenger or pseudocumene (Runs 1 and 7) an insoluble, gelled polymer polycyclopentadiene was obtained; that with scavenger but without pseudocumene (Runs 2 and 8) an insoluble, gelled polycyclopentadiene was obtained; that mixed solvents can be used (Runs 13 through 19); and that the pseudocumene levle needs to be at least 5 volume percent based on the solvent.

Example II

Runs were made to show that the triethylaluminum scavenger, when used alone, did not effect polymerization of cyclopentadiene; all runs were made at 73° F. and atmospheric pressure using 10 grams of cyclopentadiene;

| Run No. | Solvent (ml.) | Triethyl-aluminum, millimols | Time, hrs. | Observation |
|---|---|---|---|---|
| 20 | Cyclohexane (50) | 1 | 4 | No polymer |
| 21 | Benzene (100) | 1 | 3 | Do. |

Example III

These runs were made with 10 grams of cyclopentadiene in 100 ml. of cyclohexane, and 0.08 millimol of triethylaluminum was added as scavenger. After a 10-minute scavenging period, 0.5 millimol of ethylaluminum sesquichloride was added, and polymerization was allowed to proceed for 22 hours at 73° F. and atmospheric pressure in the presence of the indicated amount of alkylbenzene. The appearance of the polymer solution is indicated:

| Run No. | Alkylbenzene used | Alkylbenzene volume, ml. | Appearance of Polymer Solution |
|---|---|---|---|
| 22 | None | | Set-up gel. |
| 23 | Xylene [1] | 5.0 | Do. |
| 24 | do | 10.0 | Fluid solution. |
| 25 | do | 15.0 | Do. |
| 26 | do | 20.0 | Do. |
| 27 | do | 25.0 | Do. |
| 28 | Toluene | 5.0 | Set-up gel. |
| 29 | do | 10.0 | Do. |
| 30 | do | 15.0 | Do. |
| 31 | do | 20.0 | Set-up gel. |
| 32 | do | 25.0 | Fluid solution. |

[1] A mixture of o-, m- and p-xylene.

These data show that as the number of alkyl groups on the benzene ring decreases a larger amount of the alkylbenzene is required to obtain soluble polymer.

Example IV

This run was made with 10 grams of cyclopentadinee in 95 ml. of cyclohexane, 5 ml. of pseudocumene, and 0.5 millimol of ethylalumium sesquichloride without the use of a scavenger. At 73° F. and atmospheric pressure, a set-up gel was obtained in about 10 minutes. These data show the necessity of using the scavenger even when an alkylbenzene is used.

Reasonable variations and modifications are possible within the scope of the foregoing disclosure and the appended claims to the invention.

I claim:
1. A process for the polymerization of a monomer represented by the formula:

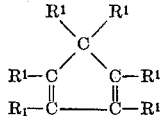

wherein each $R^1$ is selected from the group consisting of alkyl, cycloalkyl, and aryl groups, and combinations thereof, containing from 1 to 16 carbon atoms, and hydrogen, the $R^1$'s being the same or different; in the presence of a solvent for said monomer, an alkylbenzene, and a catalyst represented by the formula $Al(R^2)_n X_{3-n}$ wherein each $R^2$ is independently selected from the group consisting of alkyl, cycloalkyl, aryl, and combinations thereof, containing from 1 to 16 carbon atoms, X is a halogen, and $n$ is 0, 1 or 2; said alkylbenzene being represented by the formula:

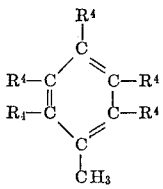

wherein each $R^4$ is independently selected from the group consisting of hydrogen and methyl; comprising contacting said monomer, said solvent and said alkylbenzene with a scavenger represented by the formula $M(R^3)_y$ wherein M is a metal selected from the group consisting of the metals of Groups I-A, II-A, II-B and III-A of the Periodic Table, each $R^3$ is independently selected from the group consisting of alkyl, cycloalkyl, aryl, and combinations thereof, containing from 1 to 16 carbon atoms, and $y$ is the valence of metal M; said contacting being at a temperature in the range of 32° F. to 150° F. and a pressure in the range of about atmospheric to 100 p.s.i.a. for a period of time in the range of 1 to 60 minutes prior to the contact of said catalyst with said monomer, said solvent and said alkylbenzene, and contacting said catalyst with the thus scavenged monomer, solvent and alkylbenzene under polymerization conditions.

2. A process in accordance with claim 1 wherein said solvent is at least one material selected from the group consisting of cycloaliphatic, alkylcycloaliphatics wherein the alkyl group contains from 1 to 3 carbon atoms, and benzene.

3. A process in accordance with claim 1 wherein at least two of said $R^4$'s are methyl.

4. A process in accordance with claim 1 wherein said solvent is present in an amount in the range of 100 to 2500 milliliters of solvent per 100 grams of monomer; said scavenger is added in an amount in the range of 0.1 to 10 millimols of scavenger per 100 grams of the material to be scavenged; said catalyst is present in a concentration of 1 to 25 millimols per 100 grams of monomer; and the amount of said alkylbenzene is at least 5 volume percent, based on said solvent, when alkylbenzenes having at least three methyl groups are utilized, at least 10 volume percent, based on said solvent, when dimethylbenzenes are utilized, and at least 25 volume percent, based on said solvent, when toluene is utilized.

5. A process in accordance with claim 2 wherein said solvent is present in an amount in the range of 500 to 1500 mllliiters of solvent per 100 grams of monomer; said scavenger is added in an amount in the range of 2 to 8 millimols of scavenger per 100 grams of the material to be scavenged; said catalyst is present in a concentration of 3 to 15 millimols per 100 grams of monomer; and the amount of said alkylbenzene is at least 5 volume percent, based on said solvent, when alkylbenzenes having at least three methyl groups are utilized, at least 10 volume percent, based on said solvent, when dimethylbenzenes are utilized, and at least 25 volume percent, based on said solvent, when toluene is utilized.

6. A process in accordance with claim 1 wherein said polymerization reaction conditions comprise a temperature in the range of 32° F. to 150° F., a time in the range of 1 minute to 24 hours, and a pressure in the range of about atmospheric to 100 p.s.i.a.

7. A process in accordance with claim 2 wherein said monomer is cyclopentadiene, said alkylbenzene is a pseudocumene, said scavenger is triethylaluminum, and said catalyst is ethylaluminum sesquichloride.

References Cited

UNITED STATES PATENTS

| | | | |
|---|---|---|---|
| 2,884,468 | 4/1959 | Young | 260—666 |
| 3,004,087 | 10/1961 | Goddard et al. | 260—683.15 |
| 3,196,188 | 7/1965 | Parrish et al. | 260—666 |
| 3,225,113 | 12/1965 | McNulty et al. | 260—683.15 XR |
| 3,235,614 | 2/1966 | Fritz et al. | 260—666 |

DELBERT E. GANTZ, *Primary Examiner.*

C. R. DAVIS, *Assistant Examiner.*